UNITED STATES PATENT OFFICE.

OTTO LIEBKNECHT, OF FRANKFORT-ON-THE-MAIN, AND FERDINAND BLUMENTHAL, OF WIESBADEN, GERMANY.

PROCESS OF MAKING AUXILIARY MORDANTS CONTAINING ANTIMONY AND GLYCOLIC ACID.

1,059,741.  Specification of Letters Patent.  Patented Apr. 22, 1913.

No Drawing.  Application filed October 16, 1911.  Serial No. 655,055.

*To all whom it may concern:*

Be it known that we, OTTO LIEBKNECHT and FERDINAND BLUMENTHAL, citizens of the German Empire, and residents, respectively, of Frankfort-on-the-Main and Wiesbaden, in said Empire, have invented certain new and useful Improvements in Processes of Making Auxiliary Mordants Containing Antimony and Glycolic Acid, and of which the following is a specification.

In studying glycolic acid and its salts we have made the observation that very valuable technical products, which may be applied particularly as auxiliary mordants, may be successfully produced by treating antimony or its compounds with glycolic acid, or with its salts. In this manner salts are obtained under suitable conditions which do not allow the antimony to precipitate itself in very dilute aqueous solutions. For preparing such salts, various methods may be employed: Aqueous solutions of glycolic acid are saturated with freshly precipitated or amorphous commercial antimony oxid in the presence of alkalis or alkaline earth-metals, after which the solution is evaporated to dryness or permitted to crystallize at a certain concentration. A sodium salt which contains about 30% of antimony is thus easily obtained. These highly concentrated salts easily allow the antimony oxid to precipitate on being dissolved in much water, especially on being heated. Permanent clear solutions, however, are obtained when free glycolic acid or glycolates are added to the salts. Of course these acid glycolates may be added from the start to the solutions saturated with antimony, and then clear soluble products are obtained even when heated. The same result is also obtained when no complete saturation with antimony oxid has taken place. Furthermore, antimony oxy-chlorid, such as is produced by decomposing trichlorid of antimony with water, may be treated with neutral glycolates in order to arrive at quite similar products as before, which in general differ only by their contents of chlorid of sodium or chlorid of calcium from the products produced according to the process above described. In place of oxy-chlorid of antimony also other antimony salts may be applied, such as fluorids or oxalates. Also the meta-antimonic acid salts react with glycolic acid in the manner desired. Furthermore, solutions of acid glycolates are brought into reaction with metallic antimony under the application of air, either by treating the powdered antimony in a shaking apparatus with solutions of acid glycolates, or by passing a stream of air through a suspension of antimony powder in a solution of an acid glycolate, or by combining both processes.

According to the above processes double salts may be produced, such as, for instance, potassium sodium glycolate of antimony, etc. For the production of antimony compounds the acid or neutral glycolic acid salts of alkalis and alkaline earth-metals are particularly well adapted.

The following example may give an approximate idea of the new process: 76 parts of glycolic acid are saturated in an aqueous solution with soda and 76 parts of glycolic acid are added thereto. The solution is then heated to 70-80° C. and freshly precipitated antimony oxid added thereto until dissolved. The solution is then filtered to remove the slight excess of antimony oxid and evaporated to dryness. In this manner about 300 parts of a crystalline product, capable of resisting the atmosphere, are obtained, which contain about 30% of antimony. In order to obtain a product which is clearly soluble in a great quantity of water, the solution obtained above is once more mixed with about the same quantity of acid sodium glycolate, and the mixture in solution is then evaporated to dryness. In this manner about 480 parts of a product are obtained which contains about 18% of antimony, and which does not decompose even when heated in a very much diluted solution.

We claim:

1. The herein described process of converting a glycolic acid compound into a mordant, which consists in treating said compound with a substance containing antimony.

2. The herein described process of converting a glycolic acid compound into a mordant, which consists in treating said compound with compounds of antimony.

3. The herein described auxiliary mordants, consisting of a compound of glycolic acid and a substance containing antimony.

In testimony whereof we have signed our names to this specification in the presence of two subscribing witnesses.

OTTO LIEBKNECHT.
FERDINAND BLUMENTHAL.

Witnesses for both applicants:
JEAN GRUND,
CARL GRUND.